July 7, 1931. R. W. BARRETT 1,813,269
LOAD BLOCKING DEVICE FOR FREIGHT CARS AND THE LIKE
Filed Sept. 12, 1929
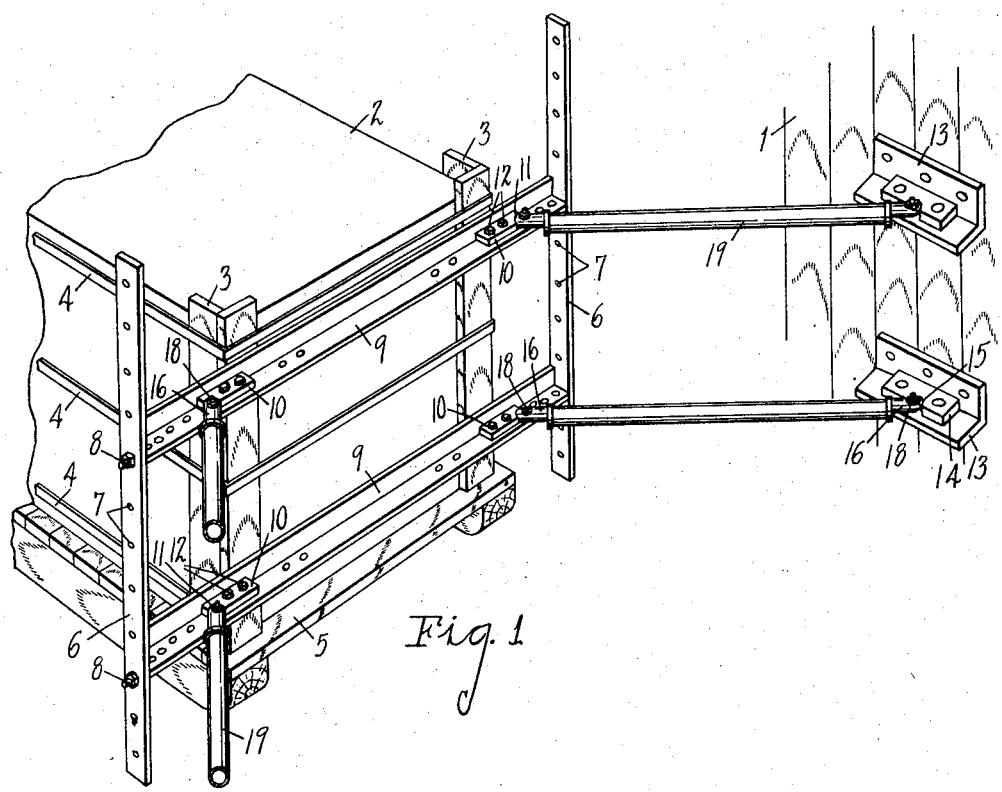
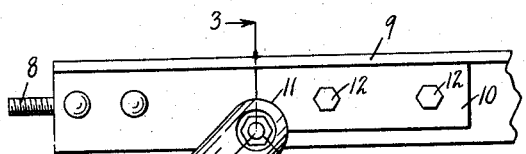
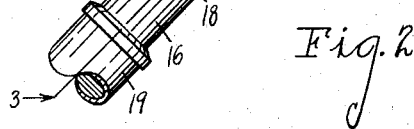
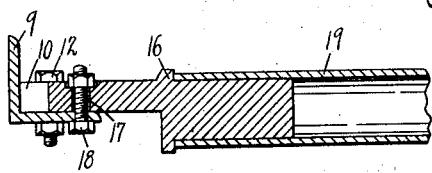
INVENTOR
Ray W. Barrett
BY Chappell & Earl
ATTORNEYS Patented July 7, 1931

1,813,269

UNITED STATES PATENT OFFICE

RAY W. BARRETT, OF KALAMAZOO, MICHIGAN

LOAD BLOCKING DEVICE FOR FREIGHT CARS AND THE LIKE

Application filed September 12, 1929. Serial No. 392,042.

There is a large amount of loss to railroad companies and shippers owing to the damage resulting from the shifting of the load in the cars, and this in spite of the fact that it is common practice to block the load by building in supporting frames and structures. This is very frequently ineffective for the purpose, is very expensive, lumber and timber being used but once, and frequently results in serious injury to the car owing to the timbers being spiked or nailed to parts thereof.

It is the main object of this invention to provide a blocking apparatus by means of which loads may be effectively positioned and blocked in a freight car which enables the rapid loading and unloading, securely retains the load in position without injury thereto and may be repeatedly used.

Objects pertaining to details and economies of my invention will definitely appear from the description to follow. The invention is defined in the claims.

A structure embodying the features of my invention is clearly illustrated in the accompanying drawings, in which:

Fig. 1 is a fragmentary perspective view illustrating my improved blocking apparatus in operative relation to a load within a freight car, a fragment of the wall of a freight car being illustrated.

Fig. 2 is a fragmentary view illustrating details of the connection for one of the struts to its load engaging thrust bar.

Fig. 3 is a fragmentary section on broken line 3—3 of Fig. 2.

In the accompanying drawings, 1 represents the wall of a freight car and 2 the load to be blocked, which in this instance is a bale of paper. The packing for this bale comprises angled corner uprights 3 and bands 4 arranged around these uprights.

The load is placed upon a skid 5 which is of a character to receive a hoisting truck so that the truck may be run under the same, the load lifted, and transported. In practice these skids are loaded outside of the car, moved into the car, positioned, and blocked in place. However, great difficulty has been experienced in effective blocking of these loads, it being common practice to employ timbers which are secured to the bottom and sides of the car.

I provide a load engaging abutment consisting of uprights 6 having a plurality of holes 7 therein adapted to receive the threaded studs 8 on the ends of the thrust bars 9 so that the thrust bars may be suitably positioned to engage the corner uprights 3. The thrust bars are preferably formed of angle iron and disposed with their angles facing upwardly. On their horizontal legs I mount thrust blocks 10 having curved seats 11 at their outer corners.

The thrust bars are preferably provided with sets of holes adapted to receive the securing bolts 12 of these thrust blocks so that the thrust blocks may be adjusted on the bars as desired. The wall thrust plates 13 are preferably formed of angle iron adapted to be bolted or nailed to the wall 1 of a freight car. These thrust plates are of angle cross section, their horizontal arms being provided with thrust blocks 14 having curved seats 15 therein.

Coupling members 16 are pivotally mounted on the thrust plates and abutment bars and provided with curved ends coacting with the seats in the thrust blocks of these members. The holes 17 in the coupling members engaging the pivot bolts 18 are of such size that the load is sustained by the thrust blocks. These coupling members are shouldered to receive the struts 19. If desired, these struts may be provided with adjusting screws or extending means as illustrated in my copending application filed concurrently herewith.

I have illustrated my improvements in an embodiment which I have found highly practical. I have not attempted to illustrate or describe various modifications and adaptations which might be desirable for different kinds of loads as it is believed that this disclosure will enable those skilled in the art to embody or adapt my improvements as may be desired.

The structure is highly desirable in that the loads are effectively blocked, may be quickly blocked or released and with slight damage or injury to the car, the plates 13 being of such length as to embrace a substantial portion of the wall of the car.

Having thus described my invention what I claim as new and desire to secure by Letters Patent is:

1. In a blocking apparatus, the combination of a load engaging abutment comprising uprights, angle iron thrust bars mounted for independent vertical adjustment on said uprights with their angles facing upwardly, their horizontal arms being provided with adjustable thrust blocks having curved seats, thrust plates adapted to be secured to the side walls of a freight car and provided with thrust blocks having curved seats, shouldered coupling members pivotally mounted on said thrust bars and thrust plates and having rounded ends coacting with said seats in said thrust blocks, and tubular struts engaging said shouldered coupling members.

2. In a blocking apparatus, the combination of a load engaging abutment comprising uprights, thrust bars mounted on said uprights and provided with thrust blocks having curved seats, thrust plates adapted to be secured to the side walls of a freight car and provided with thrust blocks having curved seats, shouldered coupling members pivotally mounted on said thrust bars and thrust plates and having rounded ends coacting with said seats in said thrust blocks, and tubular struts engaging said shouldered coupling members.

3. In a blocking apparatus, the combination of a load engaging abutment comprising load engaging thrust bars mounted for independent vertical adjustment and provided with strut seats, wall plates provided with strut seats, coupling members pivotally mounted on said thrust bars and wall plates to coact with said seats, and struts engageable at their ends with said coupling members.

4. In a blocking apparatus, the combination of a load engaging abutment comprising uprights, thrust bars mounted on said uprights, thrust plates adapted to be secured to walls of a freight car, coupling members pivotally mounted on said thrust bars and thrust plates, and struts detachably engaging said coupling members.

5. In a blocking apparatus the combination of a load engaging abutment, a plurality of struts pivotally engaging said abutment, and wall plates for supporting the opposite ends of said struts.

6. In a blocking apparatus, the combination of a load engaging abutment, a thrust plate adapted to be secured to the wall of a freight car, a coupling member pivotally mounted on said thrust plate, and a load supporting strut detachably engaging said coupling member.

In witness whereof I have hereunto set my hand.

RAY W. BARRETT.